(12) United States Patent
Liu et al.

(10) Patent No.: US 11,487,472 B2
(45) Date of Patent: Nov. 1, 2022

(54) MANAGEMENT METHOD AND APPARATUS FOR COEXISTING MULTI-STORAGE MEDIUMS

(71) Applicant: Amlogic (Shenzhen), Ltd., Shenzhen (CN)

(72) Inventors: Xianjun Liu, Shenzhen (CN); Liang Yang, Shenzhen (CN); Qiang Li, Shenzhen (CN); Bichao Zheng, Shenzhen (CN)

(73) Assignee: AMLOGIC (SHENZHEN), LTD., Shenzhen (CN)

( * ) Notice: Subject to any disclaimer, the term of this patent is extended or adjusted under 35 U.S.C. 154(b) by 0 days.

(21) Appl. No.: 17/128,227

(22) Filed: Dec. 21, 2020

(65) Prior Publication Data

US 2021/0200476 A1 Jul. 1, 2021

(30) Foreign Application Priority Data

Dec. 25, 2019 (CN) .......................... 201911363466.7

(51) Int. Cl.
*G06F 3/06* (2006.01)
(52) U.S. Cl.
CPC ............ *G06F 3/0659* (2013.01); *G06F 3/061* (2013.01); *G06F 3/0632* (2013.01); *G06F 3/0688* (2013.01)

(58) Field of Classification Search
CPC ...... G06F 3/0659; G06F 3/061; G06F 3/0632; G06F 3/0688; G06F 3/0665; G06F 3/0605; G06F 3/0634; G06F 13/102; G06F 13/1694
See application file for complete search history.

(56) References Cited

U.S. PATENT DOCUMENTS

| | | |
|---|---|---|
| 9,009,437 B1 * | 4/2015 | Bjornsson ............. G06F 3/0689 711/170 |
| 2005/0216481 A1 * | 9/2005 | Crowther .............. G06F 3/0607 |
| 2009/0307451 A1 * | 12/2009 | Abzarian ............ G06F 12/1483 711/163 |

* cited by examiner

*Primary Examiner* — Kalpit Parikh

(57) ABSTRACT

The present disclosure provides a management method and an apparatus for coexisting multi-storage mediums. The method includes: scanning a plurality of storage mediums to identify the storage medium operating in an online mode; configuring the storage medium operating in the online mode as a first storage medium; establishing a doubly linked list by a controller, wherein the doubly linked list records storage mediums operating in the online mode; determining whether the first storage medium is in a register table; turning on a switching mode of the first storage medium upon determining the first storage medium is in the register table; and retrieving a switching command via a storage layer, wherein the switching command is generated by the controller in response to user request.

20 Claims, 5 Drawing Sheets

MANAGEMENT METHOD AND APPARATUS FOR COEXISTING MULTI-STORAGE MEDIUMS

CROSS REFERENCE TO RELATED APPLICATIONS

The present disclosure claims priority to Chinese Patent Application No. CN 201911363466.7, filed Dec. 25, 2019, which is hereby incorporated by reference herein as if set forth in its entirety.

BACKGROUND

1. Technical Field

The present disclosure relates to storage medium technology, and particularly to a management method and an apparatus for coexisting multi-storage mediums.

2. Description of Related Art

The CPU controllers in embedded devices, such as mobile phones and smart tablets, often support a variety of different storage mediums, such as eMMC, UFS, Nand Flash, SPI-AND Flash, SPI-NOR Flash, and so on. In the bootloader, different storage mediums may be used by own initializing functional interfaces and commands. Therefore, there is an urgent need to propose a compatible solution for switching between various types of storage mediums without the inconvenience of switching due to numerous functional interfaces and commands.

BRIEF DESCRIPTION OF THE DRAWINGS

To describe the technical schemes in the embodiments of the present disclosure or in the prior art more clearly, the following briefly introduces the drawings required for the descriptions in the present disclosure. It should be understood that, the drawings in the following description merely show some embodiments of the present disclosure. For those skilled in the art, other drawings can be obtained according to the drawings without creative efforts.

DETAILED DESCRIPTION

In order to make the objects, features and advantages of the present disclosure more obvious and easy to understand, the technical solutions of the present disclosure will be further described below with reference to the drawings and the embodiments. Apparently, the described embodiments are part of the embodiments of the present disclosure, not all of the embodiments. All other embodiments obtained by those skilled in the art based on the embodiments of the present disclosure without creative efforts are within the scope of the present disclosure.

Figure 1:
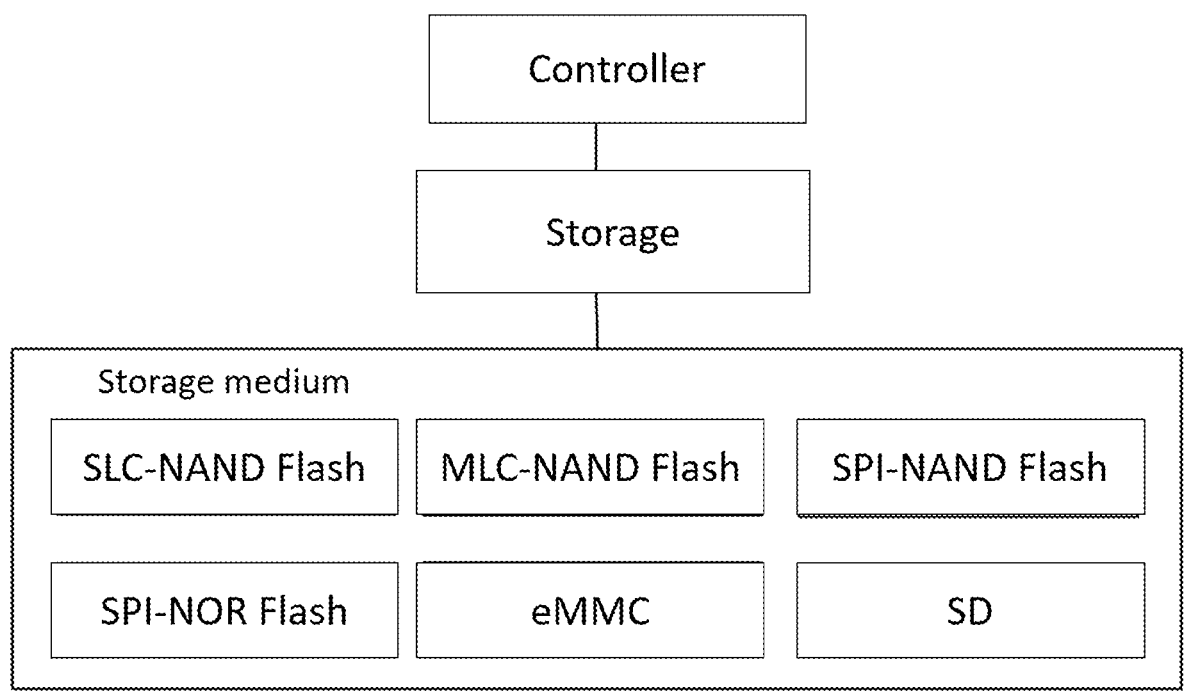
FIG. 1 is a block diagram of the management apparatus for coexisting multi-storage mediums in accordance with one embodiment of the present disclosure.

FIG. 1 is a block diagram of the management apparatus for coexisting multi-storage mediums in accordance with one embodiment of the present disclosure. The management apparatus for coexisting multi-storage mediums includes a controller, a storage module comprising a plurality of computer-readable storage mediums, and at least one input device. The controller connects to the storage module, and the storage module connects to the each of the computer-readable storage mediums. In addition, the input device is configured to receive request from the user.

The computer-readable storage mediums may include SLC-NAND Flash, MLC-NAND Flash, SPI-NAND Flash, SPI-NOR Flash, eMMC, SD, and so on.

The controller is configured to control the storage module to output corresponding switching commands.

The storage module is configured to create storage medium partitions, and each of the storage medium partition corresponds to one storage medium. For instance, a SPI-NAND Flash storage medium partition is created for the SPI-NAND storage medium. Afterward, in response to the controller, the storage module creates a mapping between the storage medium partition and each of the storage medium partitions.

The storage module is configured in a storage layer above each of the storage mediums after the bootloader is launched. In brief, the storage module is configured as an operation interface engaging with the storage mediums. In one embodiment, the switching command may include fields including: a source, an operation, a destination address, a partition name indicative of the storage medium, an offset indicative of the offset of a distance between the source data address and the respective partition, and a size indicative of the data size. In an example, the command may be "store read addr name off size." This means that the command is from the storage module.

In view of the above, the storage module is configured to drive each of the storage mediums.

Figure 2:
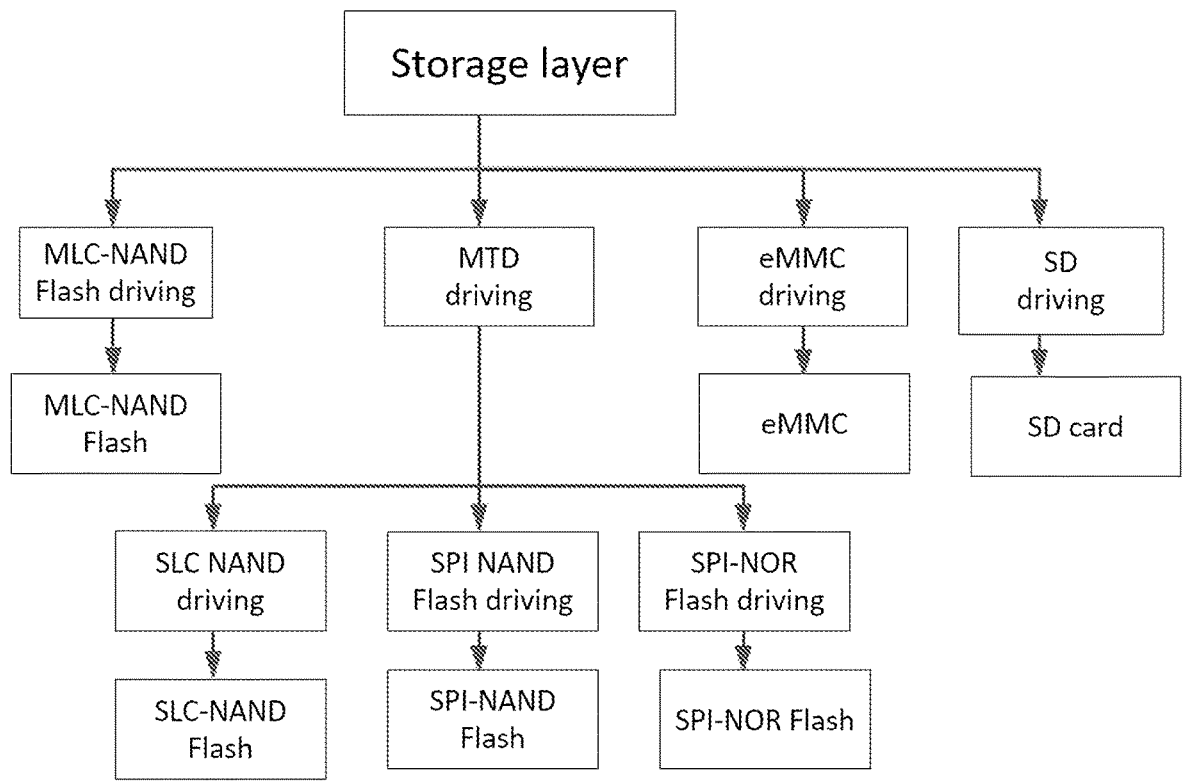
FIG. 2 is a schematic view showing the connection between the management apparatus and the multi-storage mediums in accordance with one embodiment of the present disclosure.

FIG. 2 is a schematic view showing the connection between the management apparatus and the multi-storage mediums in accordance with one embodiment of the present disclosure. Referring to FIG. 2, a driving module corresponding to each of the storage medium is configured within the storage module. For instance, the SLC-NAND Flash is driven by a SLC-NAND Flash driving sub-module within the storage module. Also, the MLC-NAND Flash is driven by a MLC-NAND Flash driving sub-module within the storage module.

Figure 3:
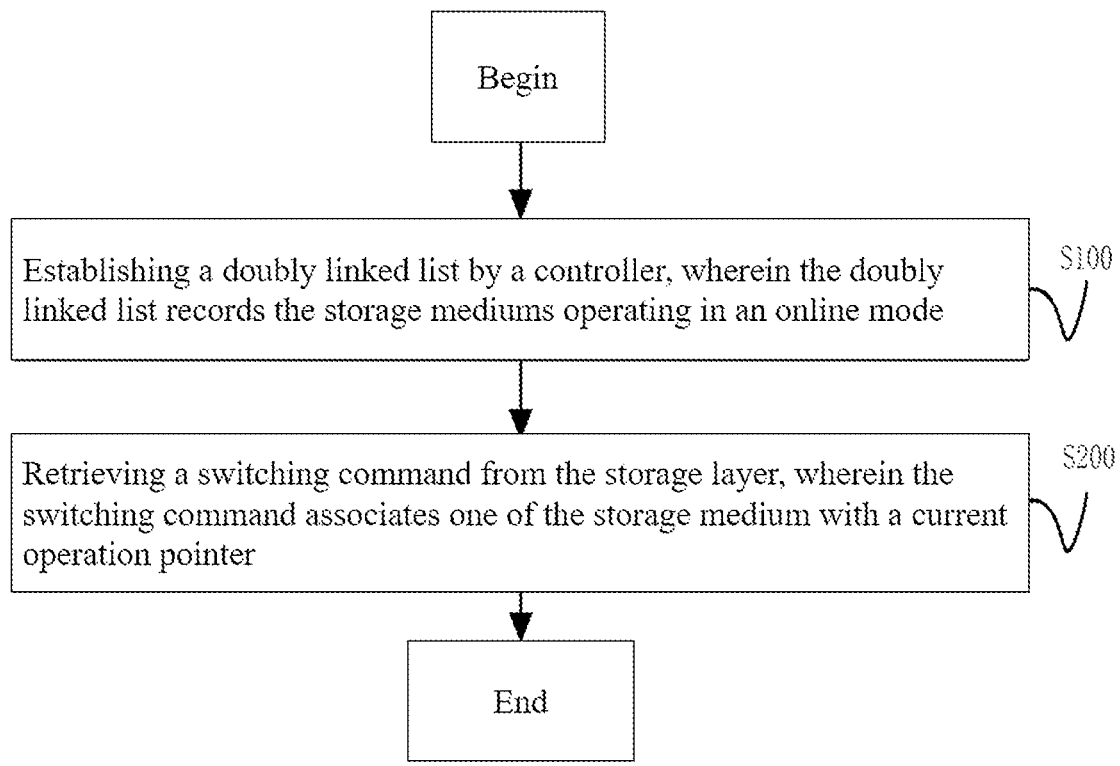
FIG. 3 is a flowchart illustrating the management method for coexisting multi-storage mediums in accordance with one embodiment of the present disclosure.

FIG. 3 is a flowchart illustrating the management method for multi-storage mediums in accordance with one embodiment of the present disclosure.

The method includes the following steps:

In step S100, establishing a doubly linked list by a controller, wherein the doubly linked list records the storage mediums operating in an online mode;

In step S200, retrieving a switching command from the storage layer, wherein the switching command associates one of the storage medium with a current operation pointer. In this way, the corresponding reading/writing operations will be performed according to the current operation pointer.

After the doubly linked list is created by the controller, the controller is configured to generate corresponding switching command in response to user request. In one example, the switching command may be "store device SPI-NAND." In response to this switching command, the SPI-NAND Flash is associated with the current operation pointer. In another embodiment, the storage mediums may be arranged sequentially, and the switching command may be adopted to associate a plurality of the storage mediums with a current operation pointer.

Figure 4:
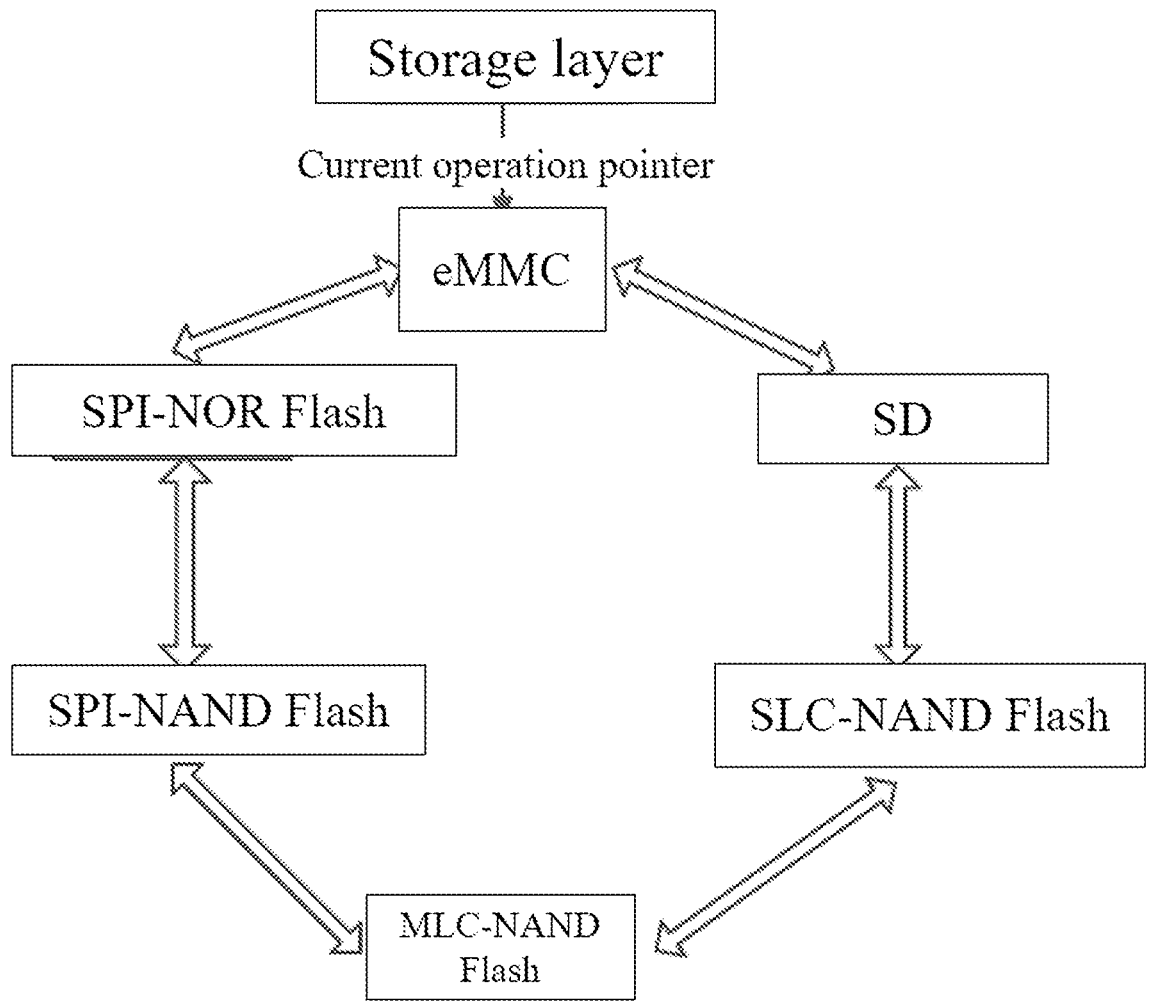
FIG. 4 is a schematic view showing the interactions between the switching commands and the corresponding storage mediums in accordance with one embodiment of the present disclosure.

FIG. 4 is a schematic view showing the interactions between the switching commands and the corresponding storage mediums in accordance with one embodiment of the present disclosure.

In one embodiment, the controller is configured to control the storage module to output corresponding switching commands when the storage medium is online, and the storage medium is in a register table. The determination is made by the following steps:

Scanning a plurality of storage mediums to identify the storage medium operating in an online mode;

Configuring the storage medium operating in the online mode as a first storage medium;

Determining whether the first storage medium is in the register table; and

Turning on a switching mode of the first storage medium upon determining the first storage medium is in the register table.

If the first storage medium is not in the register table, the first storage medium is registered into the doubly linked list.

The storage mediums may include, but not limited to, SLC-NAND Flash, MLC-NAND Flash, SPI-NAND Flash, SPI-NOR Flash, eMMC, and SD. With respect to the SLC-NAND Flash, MLC-NAND Flash, SPI-NAND Flash, SPI-NOR Flash, it can be determined whether they are the first storage medium by reading the flash ID. If the flash ID is readable and correct, it can be determined that the storage medium is online.

With respect to the eMMC, and SD, an initialization command, such as "cmd1", may be sent to the storage medium. The storage medium is determined as online upon determining an acknowledge message is received.

In one embodiment, when a plurality of storage mediums operates in online mode, the following steps will be executed:

Configuring a plurality of storage mediums operating in the offline mode as second storage mediums;

Labeling the second storage mediums, and withdrawing the second storage mediums from the step of creating the doubly linked list.

Figure 5:
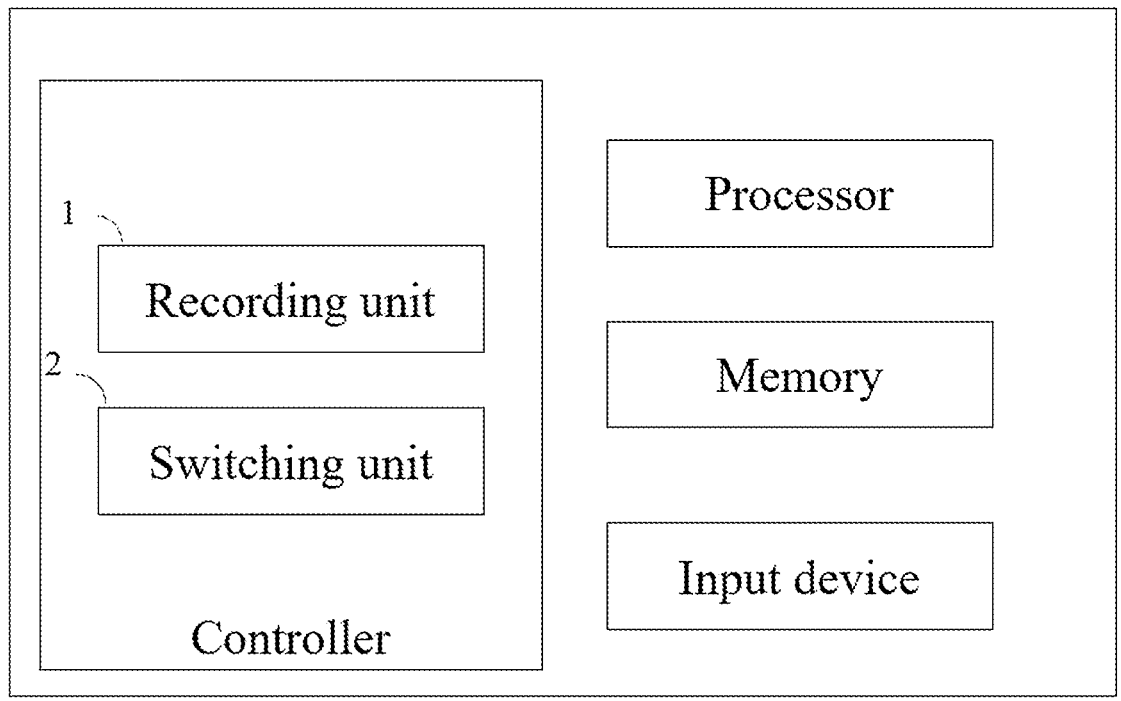
FIG. 5 is a block diagram of the management apparatus for the coexisting multi-storage mediums in accordance with one embodiment of the present disclosure.

FIG. 5 is a block diagram of the management apparatus for the multi-storage mediums in accordance with one embodiment of the present disclosure. The management apparatus includes at least one processor, a controller, a storage module comprising a plurality of storage mediums, and at least one input device.

The management apparatus includes:

a recording unit 1 configured to create the doubly linked list for the storage medium, wherein the doubly linked list records the storage mediums operating in the online mode; and a switching unit 2 configured to retrieve a switching command from the storage layer, and associate one of the storage medium with a current operation pointer via the switching command.

In one embodiment, the recording unit 1 includes:

a scanning module configured to scan a plurality of storage mediums and to identify the storage medium operating in the online mode;

a determination module configured to determine whether the first storage medium is in the register table; and a labeling module configured to label the registered first storage medium as a switchable storage medium via the switching command, and configured to register the first storage medium in the doubly linked list upon determining the first storage medium is not in the register table.

In one embodiment, the scanning module includes:

a reading sub-module configured to read the flash ID of the storage medium, including SLC-NAND Flash, MLC-NAND Flash, SPI-NAND Flash, SPI-NOR Flash; and a first determination sub-module configured to enable the online mode of the storage medium upon successfully reading the flash ID; otherwise, the storage medium is determined as in the offline mode.

In one embodiment, the scanning module includes:

a receiving sub-module configured to send an initialization command to storage mediums, including eMMC and SD, and to determine whether an acknowledge message is received; and a second determination sub-module configured to enable the online mode of the storage medium upon successfully receiving the acknowledge message; otherwise, the storage medium is determined as in the offline mode.

In one embodiment, the scanning module includes:

an offline determination sub-module configured to configure the storage mediums operating in the online mode as second storage mediums; and an offline withdrawing sub-module configured to label the second storage mediums and to withdraw the second storage mediums from the process of creating the doubly linked list.

In view of the above, the doubly linked list is configured to record the online readable storage medium. The media switching command sent via the storage layer is configured to associate one of the storage medium with a current operation pointer. Embodiments are used in the present disclosure to illustrate the principle and implementation of the present disclosure. The descriptions of the forgoing embodiment are only used to help understand the technical schemes of the present disclosure and their core ideas. At the same time, for those skilled in the art, according to the ideas of the present disclosure, there will be changes in the specific implementation and the application scope. In summary, the contents of the present disclosure should not be construed as limitations to the present disclosure.

What is claimed is:

1. A management method for multi-storage mediums, comprising:
    scanning a plurality of storage mediums to identify the storage medium operating in an online mode;
    configuring the storage medium operating in the online mode as a first storage medium;
    establishing a doubly linked list by a controller, wherein the doubly linked list records the storage mediums operating in the online mode;
    determining whether the first storage medium is in a register table;
    turning on a switching mode of the first storage medium upon determining the first storage medium is in the register table; and
    retrieving a switching command via a storage layer, wherein the switching command is generated by the controller in response to user request inputted from an input device, and the switching command is configured to associate one of the storage mediums in the doubly linked list with a current operation pointer.

2. The method as claimed in claim 1, wherein the determining step further comprises:
registering the first storage medium in the doubly linked list upon determining the first storage medium is not in the register table.

3. The method as claimed in claim 2, wherein the method further comprises:
configuring at least one storage mediums operating in an offline mode as a second storage medium; and
labeling the second storage medium, and removing the second storage medium from the doubly linked list.

4. The method as claimed in claim 3, wherein the storage mediums comprise SLC-NAND Flash, MLC-NAND Flash, SPI-NAND Flash, SPI-NOR Flash, and the scanning step further comprises:
reading a flash ID of the storage medium; and
enabling the online mode of the storage medium upon successfully reading the flash ID.

5. The method as claimed in claim 3, wherein the storage mediums comprise eMMC and SD, and the scanning step further comprises:
sending an initialization command to the storage medium and determining whether an acknowledge message is received; and
enabling the online mode of the storage medium upon successfully receiving the acknowledge message.

6. The method as claimed in claim 3, wherein a partition is created for each of the storage medium.

7. The method as claimed in claim 6, wherein the switching command comprises a source, an operation, a destination address, a name of the partition associated with the storage medium, an offset indicative of a distance between the source data address and the respective partition, and a size indicative of the data size.

8. The method as claimed in claim 3, wherein the storage mediums are arranged sequentially, and the switching command is configured to associate a plurality of storage mediums with a current operation pointer.

9. A management apparatus for multi-storage mediums, comprising:
a memory;
a processor; and
one or more computer programs stored in the memory and executable on the processor, wherein the one or more computer programs comprise:
instructions for scanning a plurality of storage mediums to identify the storage medium operating in an online mode;
instructions for configuring the storage medium operating in the online mode as a first storage medium;
instructions for establishing a doubly linked list by a controller, wherein the doubly linked list records storage mediums operating in the online mode;
instructions for determining whether the first storage medium is in a register table;
instructions for turning on a switching mode of the first storage medium upon determining the first storage medium is in the register table; and
instructions for retrieving a switching command via a storage layer, wherein the switching command is generated by the controller in response to user request inputted from an input device, and the switching command is configured to associate one of the storage mediums in the doubly linked list with a current operation pointer.

10. The apparatus as claimed in claim 9, wherein the instructions for the determining step further comprise:
instructions for registering the first storage medium in the doubly linked list upon determining the first storage medium is not in the register table.

11. The apparatus as claimed in claim 10, wherein the one or more computer programs comprise further comprises:
instructions for configuring at least one storage mediums operating in an offline mode as a second storage medium; and
instructions for labeling the second storage medium, and removing the second storage medium from the doubly linked list.

12. The apparatus as claimed in claim 11, wherein the storage mediums comprise SLC-NAND Flash, MLC-NAND Flash, SPI-NAND Flash, SPI-NOR Flash, and the instructions for the scanning step further comprises:
instructions for reading a flash ID of the storage medium; and
instructions for enabling the online mode of the storage medium upon successfully reading the flash ID.

13. The apparatus as claimed in claim 11, wherein the storage mediums comprise eMMC and SD, and the instructions for the scanning step further comprises:
instructions for sending an initialization command to the storage medium and determining whether an acknowledge message is received; and
instructions for enabling the online mode of the storage medium upon successfully receiving the acknowledge message.

14. The apparatus as claimed in claim 11, wherein a partition is created for each of the storage medium.

15. The apparatus as claimed in claim 14, wherein the switching command comprises a source, an operation, a destination address, a name of the partition associated with the storage medium, an offset indicative of a distance between the source data address and the respective partition, and a size indicative of the data size.

16. The apparatus as claimed in claim 11, wherein the storage mediums are arranged sequentially, and the switching command is configured to associate a plurality of storage mediums with a current operation pointer.

17. A management method for multi-storage mediums, comprising:
scanning a plurality of storage mediums to identify the storage medium operating in an online mode;
configuring the storage medium operating in the online mode as a first storage medium;
configuring at least one storage mediums operating in an offline mode as a second storage medium, and labeling the second storage medium;
establishing a doubly linked list by a controller, wherein the doubly linked list records the storage mediums operating in the online mode, and the second storage medium is removed from the establishing the doubly linked list;
determining whether the first storage medium is in a register table, and registering the first storage medium in the doubly linked list upon determining the first storage medium is not in the register table;
turning on a switching mode of the first storage medium upon determining the first storage medium is in the register table; and
retrieving a switching command via a storage layer, wherein the switching command is generated by the controller in response to user request inputted from an input device, and the switching command is configured to associate one of the storage mediums with a current operation pointer.

18. The method as claimed in claim 17, wherein the storage mediums comprise SLC-NAND Flash, MLC-NAND Flash, SPI-NAND Flash, SPI-NOR Flash, and the scanning step further comprises:
  reading a flash ID of the storage medium; and
  enabling the online mode of the storage medium upon successfully reading the flash ID.

19. The method as claimed in claim 17, wherein the storage mediums comprise eMMC and SD, and the scanning step further comprises:
  sending an initialization command to the storage medium and determining whether an acknowledge message is received; and
  enabling the online mode of the storage medium upon successfully receiving the acknowledge message.

20. The method as claimed in claim 17, wherein a partition is created for each of the storage medium.

* * * * *